(12) United States Patent
Dudda et al.

(10) Patent No.: US 10,944,514 B2
(45) Date of Patent: Mar. 9, 2021

(54) TECHNIQUE FOR TRANSFERRING DATA IN A RADIO COMMUNICATION

(71) Applicant: Telefonaktiebolaget LM Ericsson (publ), Stockholm (SE)

(72) Inventors: Torsten Dudda, Aachen (DE); Joachim Sachs, Sollentuna (SE); Henning Wiemann, Aachen (DE); Gustav Wikström, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/461,531

(22) PCT Filed: Oct. 23, 2017

(86) PCT No.: PCT/EP2017/076974
§ 371 (c)(1),
(2) Date: May 16, 2019

(87) PCT Pub. No.: WO2018/091228
PCT Pub. Date: May 24, 2018

(65) Prior Publication Data
US 2019/0356425 A1 Nov. 21, 2019

Related U.S. Application Data

(60) Provisional application No. 62/424,020, filed on Nov. 18, 2016.

(51) Int. Cl.
*H04L 1/18* (2006.01)
*H04L 1/08* (2006.01)
(Continued)

(52) U.S. Cl.
CPC .............. *H04L 1/1822* (2013.01); *H04L 1/08* (2013.01); *H04L 1/1812* (2013.01);
(Continued)

(58) Field of Classification Search
CPC ....... H04L 1/1822; H04L 1/08; H04L 1/1812; H04L 1/1858; H04L 5/0055; H04L 2001/125
See application file for complete search history.

(56) References Cited

U.S. PATENT DOCUMENTS

| 8,385,305 B1 | 2/2013 | Negus et al. |
| 2008/0170522 A1* | 7/2008 | Sammour .............. H04L 1/1877 370/310 |

(Continued)

FOREIGN PATENT DOCUMENTS

| WO | 2012159975 A1 | 11/2012 |
| WO | 2014035906 A1 | 3/2014 |

(Continued)

OTHER PUBLICATIONS

Weiner, M. et al., "Design of a Low-Latency, High-Reliability Wireless Communication System for Control Applications", 2014 IEEE International Conference on Communication, Aug. 28, 2014, pp. 1-7, IEEE.

(Continued)

*Primary Examiner* — Chi H Pham
*Assistant Examiner* — Ji-Hae Yea
(74) *Attorney, Agent, or Firm* — Coats + Bennett, PLLC

(57) ABSTRACT

A technique for transferring data in a radio communication is described. As to one method aspect of the technique, the data is received in at least two hybrid automatic repeat request (HARQ) processes (580, 582). For each of the at least two HARQ processes (580, 582), an error detection scheme is performed for the received data. For each of the at least two HARQ processes (580, 582), a feedback (596, 598) is sent based on a logical combination (589) of results (585, 587) of the error detection scheme for the at least two HARQ processes (580, 582).

18 Claims, 8 Drawing Sheets

(51) Int. Cl.
*H04L 5/00* (2006.01)
*H04L 1/12* (2006.01)

(52) U.S. Cl.
CPC ......... *H04L 1/1858* (2013.01); *H04L 5/0055* (2013.01); *H04L 2001/125* (2013.01)

(56) References Cited

U.S. PATENT DOCUMENTS

| | | | |
|---|---|---|---|
| 2011/0170491 A1* | 7/2011 | Shinohara | H04L 47/34 370/328 |
| 2011/0286436 A1 | 11/2011 | Suzuki et al. | |
| 2012/0039227 A1* | 2/2012 | Chen | H04L 1/1621 370/311 |
| 2013/0010709 A1 | 1/2013 | Earnshaw et al. | |
| 2013/0242824 A1* | 9/2013 | Lee | H04W 72/0446 370/281 |
| 2014/0376358 A1 | 12/2014 | Eder et al. | |
| 2015/0085796 A1 | 3/2015 | Xu et al. | |
| 2015/0117357 A1 | 4/2015 | Ozturk et al. | |
| 2015/0237621 A1 | 8/2015 | Zhu | |
| 2015/0271746 A1 | 9/2015 | Jang et al. | |
| 2015/0271867 A1 | 9/2015 | Lee et al. | |
| 2015/0333890 A1* | 11/2015 | Yang | H04L 5/0055 370/329 |
| 2016/0014626 A1* | 1/2016 | Yi | H04W 72/0446 370/281 |

FOREIGN PATENT DOCUMENTS

| | | | | |
|---|---|---|---|---|
| WO | WO-2014035906 A1 * | 3/2014 | ......... | H04L 1/1896 |
| WO | 2014153125 A1 | 9/2014 | | |
| WO | 2015067823 A1 | 5/2015 | | |
| WO | 2018091227 A1 | 5/2018 | | |

OTHER PUBLICATIONS

LG Electronics Inc., "PDCP ARQ", 3GPP TSG-RAN WG2 Meeting #96, Reno, USA, Nov. 14, 2016, pp. 1-2, R2-168277, 3GPP.

* cited by examiner

TECHNIQUE FOR TRANSFERRING DATA IN A RADIO COMMUNICATION

TECHNICAL FIELD

The present disclosure generally relates to a technique for transferring data in a radio communication. More specifically, methods and devices are provided for transmitting and receiving data in a radio communication.

BACKGROUND

Reliability and latency of existing radio communication techniques is insufficient for some uses case such as Critical Machine-Type Communication (CMTC). In the wide range of machine communication use cases, CMTC is a subgroup requiring very low latency, very high reliability and very high availability. M. Weiner et al. discuss in the article "Design of a Low-Latency, High-Reliability Wireless Communication System for Control Applications" (IEEE ICC 2014, Selected Areas in Communications, pages 3835 to 3841) latency and reliability of existing radio communication techniques.

In existing radio communication protocols such as 3GPP Long Term Evolution (LTE), the physical (PHY) layer provides, e.g., adaptive coding, modulation and power control as well as multi-antenna processing. For physical channels transmitting user data, a 24-bit Cyclic Redundancy Check (CRC) value is inserted, leading to a residual error of 1E-7.

The Medium Access Control (MAC) layer does multiplexing and scheduling of data from different radio bearers. In LTE, a Hybrid Automatic Repeat Request (HARQ) with incremental redundancy is implemented on the MAC layer. A typical residual error probability of 1E-3 to 1E-4 remains from the HARQ protocol, which is mainly caused by unreliable, yet efficient, HARQ feedback. For example, the residual error probability includes a contribution of an error probability for NACK (as sent) to ACK (as received).

The Radio Link Control (RLC) layer provides segmentation and concatenation of data, and if configured, ARQ functionality, i.e., RLC retransmissions, using a sliding window. The RLC layer provides in-sequence delivery to higher layers. Since both data and RLC ARQ feedback (i.e., the RLC status report) is transmitted using the 24-bit CRC of the PHY layer, a residual error probability of 1E-7 remains on the RLC layer.

The packet data convergence protocol (PDCP) layer provides header compression to reduce overhead, as well as ciphering of data to be transmitted. The PDCP layer functions as an anchor point for a lossless handover between LTE base stations (i.e., evolved Node Bs or eNBs) by forwarding outstanding data from the source eNB to the target eNB. As no additional scheme for error detection or error correction is implemented on the PDCP layer in typical LTE configurations, the PDCP layer is affected by the same residual error as the RLC layer.

The radio resource control (RRC) protocol exchanges control-signaling messages between an eNB and an LTE user equipment (UE). The RRC protocol and the user plane (e.g., Internet Protocol or IP data) use the same LTE protocol stack. Hence, RRC messages and IP data are sent via the layers PDCP, RLC, MAC and PHY.

Therefore, existing communication systems such as LTE cannot fulfill the requirements on latency and reliability for some use cases such as CMTC. A naïve approach might increase the length of the CRC field in a transport block on the PHY layer to improve observability of transmission errors. However, in case a transmission error occurs and is observed, the retransmission causes a significant additional latency, which is not acceptable in CMTC use cases. Furthermore, LTE Carrier Aggregation (CA) does not provide higher reliability even if the UE is connected to multiple eNBs.

SUMMARY

Accordingly, there is a need for mobile communication systems capable of meeting different requirements on reliability and latency in a wide range of use cases.

As to one aspect, a method of receiving data in a radio communication is provided. The method comprises or triggers a step of receiving the data in at least two Hybrid Automatic Repeat Request (HARQ) processes; a step of performing, for each of the at least two HARQ processes, an error detection scheme for the received data; and a step of sending, for each of the at least two HARQ processes, a feedback based on a logical combination of results of the error detection scheme for the at least two HARQ processes.

Embodiments can use the two or more HARQ processes to at least one of increase the reliability of the feedback, decrease the latency of the data transfer and increase the reliability of the data transfer.

By logically combining the results for sending the feedback, the reliability of the feedback can be increased. For example, if the probability for an erroneous transmission of one feedback is P, the reliability conveyed by all feedbacks can be $1-P^N$ for the data transmission, wherein N is the number of the at least two HARQ processes, i.e., the number of coupled HARQ processes.

The results of the error detection schemes for the at least two HARQ processes may be logically combined and/or redundantly sent in the feedbacks for the at least two HARQ processes. HARQ processes, for which the results of the error detection scheme are logically combined and/or redundantly sent in the feedbacks, may be referred to as coupled HARQ processes. An embodiment using coupled HARQ processes may reduce latency, e.g., when an individual NACK-feedback is erroneously received as an ACK.

Coupled HARQ processes, in which the data is redundantly transmitted (e.g., the same data being transmitted in each of the coupled HARQ processes) may be referred to as redundantly coupled HARQ processes. Embodiments using redundantly coupled HARQ processes can increase the reliability of the data transfer. For example, the reliability can be increased by jointly validating or jointly assessing the validity of the received data, e.g. on the RLC layer. The validation may include a consistency test or comparison of the data received in different redundantly coupled HARQ processes. Alternatively or in addition, at least some embodiments using redundantly coupled HARQ processes can reduce latency by avoiding a retransmission. For example, the retransmission may be avoided by determining at least one of the redundantly coupled HARQ processes in which the data has been successfully received, e.g., using an OR-combination as the logical combination.

The technique can be implemented using an existing HARQ protocol. A mobile communication system implementing the technique can be backward compatible by using one HARQ process for data to be transmitted. Alternatively or in addition, embodiments may adapt the number of coupled HARQ processes, e.g., to fulfill different requirements on reliability and/or redundancy for a wide range of use cases.

A protocol stack of the radio communication may include at least one of a physical layer (PHY layer), a Medium Access Control (MAC) layer and a Radio Link Control (RLC) layer. The method may be implemented (e.g., partly or completely) on the PHY layer, the MAC layer and/or the RLC layer. For example, the error detection scheme may be performed on the PHY layer and/or the MAC layer based on a Cyclic Redundancy Check (CRC) value protecting a Protocol Data Unit (PDU) including (e.g., partly or completely) the data. The logical combination of the results may be performed on, or reported to, the MAC layer and/or the RLC layer, e.g., by the same RLC entity for all of the coupled HARQ processes.

The data may be received in the radio communication of a radio network, e.g., a cellular network. The radio network may include a Radio Access Network (RAN), e.g., according to 3GPP Long Term Evolution (LTE) or 3GPP New Radio (NR). A station of the radio network may receive the data. The method may be performed or triggered by the receiving station of the radio network. The data may be received from and/or the feedback may be sent to a transmitting station of the radio network.

The transmitting station or the receiving station may be a base station or a mobile station (also referred to as wireless device or user equipment). The data may be received at a receiving base station or a receiving wireless device from a transmitting base station or a transmitting wireless device. The radio communication may include a downlink from the transmitting base station to the receiving wireless device. Alternatively or in addition, the radio communication may include an uplink from the transmitting wireless device to the receiving base station. Alternatively or in addition, the radio communication may include a sidelink from the transmitting wireless device to the receiving wireless device. Alternatively or in addition, the radio communication may include a backhaul link from the transmitting base station to the receiving base station.

The base station may be an evolved Node B (eNB) according to LTE or an Access Point (AP) according to Wi-Fi (also referred to as WLAN node).

The wireless device may comprise a user interface or may be an embedded system (e.g., without a user interface). The wireless device may be a User Equipment (UE). The wireless device may be a device for Machine-Type Communication (MTC). The wireless device may include a sensor and/or an actuator. The wireless device may operate (e.g., move) autonomously. The wireless device may be an industrial robot or a road vehicle.

The radio communication may be a MTC. The technique can be implemented for Critical MTC (CMTC), e.g. due to the increased reliability of the feedback. The technique can be implemented for time-critical MTC. E.g., the coupled HARQ processes can reduce latency by avoiding delayed retransmissions caused by erroneous feedback. Alternatively or in addition, retransmission can be avoided by redundantly coupled HARQ processes.

The HARQ processes may be distinguished by means of process identifiers. The process identifiers may depend on a system frame number and/or subframe number, e.g., in a downlink transfer of the data. In an uplink transfer of the data, a Downlink Control Information (DCI) in a Physical Downlink Control Channel (PDCCH) may be indicative of the process identifier. In uplink and/or downlink transfer of the data, the DCI may be indicative of a redundancy version (RV) of the data transmission.

The same feedback may be redundantly sent for each of the at least two HARQ processes based on the logical combination. For example, a binary result for each of the HARQ processes may be input to the logical combination. A binary output of the logical combination may be included in the feedback that is sent for each of the HARQ processes. The feedback may be indicative of the logically combined results, e.g., in at least one of a HARQ feedback and a Radio Link Control (RLC) feedback, e.g., an RLC status report.

The error detection scheme and/or the logical combination may be performed on the PHY layer or the MAC layer, e.g., based on a CRC value protecting a transport block. The HARQ feedback may be indicative of the logically combined results as the feedback. Alternatively or in addition, the error detection scheme and/or the logical combination may be performed on, or reported to, the RLC layer. The RLC status report may be indicative of the logically combined results as the feedback.

For example, the error detection scheme may be indicative of an error for data unsuccessfully received in a particular HARQ process on the PHY layer or the MAC layer (e.g., based on the CRC) and/or on the RLC layer (e.g., if the corresponding RLC PDU is missing according to a sequence number included in a header of any RLC PDU). Alternatively or in addition, the error detection scheme may be indicative of an error in the data received if a RLC verification (e.g., comparison) of the data (e.g., received in the corresponding one of the at least two HARQ processes) is negative.

The feedback for each of the HARQ processes may be indicative of an acknowledgement (ACK) or a negative ACK (NACK) for the data. By sending, depending on the logical combination, either the ACK or the NACK for all HARQ processes, the reliability of the feedback is increased.

For example, the increased feedback reliability can avoid that sending an HARQ NACK is erroneously received as an HARQ ACK at the transmitting station, in which case the corresponding RLC PDU is missing at the receiving station. Since a missing RLC PDU may trigger a reordering timer at the RLC layer of the receiving station and the transmitting station erroneously assumes a successful reception, the expiring reordering timer at the RLC layer would trigger an RLC retransmission. Such a source of latency (e.g., the retransmission) and/or involvement of higher layers (e.g., the RLC layer) can be avoided in embodiments due to increased feedback reliability.

A retransmission of the data in each of the at least two HARQ processes may be received in response to sending the feedback. The data may be retransmitted, if the feedback, as received at the data transmitter, is indicative of a NACK for at least one of the HARQ processes. Thus, the erroneous reception of an ACK for some and not all of the HARQ processes may not prevent or delay the retransmission.

The retransmission may be a HARQ retransmission or an RLC retransmission. For example, the HARQ retransmission may be requested by sending the NACK as the feedback for each of the coupled HARQ processes according to the logical combination. Receiving one or some of the NACK feedbacks as erroneous ACK may still trigger the HARQ retransmission. Thus, the HARQ retransmission may be received before the reordering timer at the RLC layer expires, which avoids latency due to involvement of higher layers, e.g., due to an RLC retransmission.

In an uplink transfer of the data, a Physical Hybrid-ARQ Indicator Channel (PHICH) may carry (in downlink direction) the HARQ feedback (e.g., ACK or NACK) for the data. The PHICH may be located in the first OFDM symbol of each subframe. The retransmissions may be scheduled at fixed time intervals without including a HARQ process identifier in the retransmitted data. In a downlink transfer of the data, an Uplink Control Information (UCI) on a Physical Uplink Control Channel (PUCCH) or a Physical Uplink Shared Channel (PUSCH) may carry the HARQ feedback.

In a first variant, the feedback sent for each of the at least two HARQ processes may be indicative of an ACK if the error detection scheme results in no error for at least one of the HARQ processes. The feedback sent for each of the at least two HARQ processes may be indicative of a NACK if the error detection scheme results in an error for each of the HARQ processes. Representing success and error in each of the results by logical 1 (or true) and logical 0 (or false), respectively, the logical combination may be an OR-combination.

In a second variant, the feedback sent for each of the at least two HARQ processes may be indicative of an ACK if the error detection scheme results in no error for each of the HARQ processes. The feedback sent for each of the at least two HARQ processes may be indicative of a NACK if the error detection scheme results in an error for at least one of the HARQ processes. Representing success and error in each of the results by logical 1 (or true) and logical 0 (or false), respectively, the logical combination may be an AND-combination.

The data received in the at least two HARQ processes may be based on a redundant transmission of the data in the at least two HARQ processes (i.e., redundantly coupled HARQ processes), e.g., in the first and/or second variant. For example, the same data may be transmitted via each of the at least two HARQ processes (which may be referred to as full redundancy). Alternatively or in combination, the data transmitted via the at least two HARQ processes may be partly redundant. For example, the data received in one of the coupled HARQ processes may include a forward error correction for the data received in another one of the coupled HARQ processes. In each of the HARQ processes, the data may include payload data dedicated to the corresponding HARQ process and error correcting data for the dedicated payload data of another HARQ process. If the error detection scheme indicates an error in the dedicated payload data of a first HARQ process, the dedicated payload data may be recovered using a block decoder for a systematic code. The decoder may receive the dedicated payload data of the first HARQ process as a systematic first channel and the corresponding error correcting data as a non-systematic second channel. Success of the decoding may be verified by repeating the error detecting scheme.

The data transmitted and/or retransmitted in each of the at least two HARQ processes may be the same data. The data may be transmitted and/or retransmitted using different redundancy versions (RVs) of the same data. In case the error detection scheme results in an error for each of the redundantly coupled HARQ processes, the data received on redundantly coupled HARQ processes may be combined. For example, soft-bits received in the at least two HARQ processes may be soft-combined (e.g., on the PHY layer and/or the MAC layer). The data may be successfully received (e.g., successfully decoded) based on the soft combination, thus avoiding the latency caused by a HARQ retransmission.

Alternatively or in addition, the data received on redundantly coupled HARQ processes may be compared. The data received in the at least two HARQ processes may be compared on the MAC layer and/or the RLC layer. The error detection scheme may include the comparison. Alternatively or in addition, the comparison may be performed subsequent to performing the error detection scheme, e.g., subject to the condition that the error detection scheme is indicative of no error for all HARQ processes used in the comparison.

In a third variant, the received data may include first data transmitted in a first HARQ process and second data different from the first data transmitted in a second HARQ process. For example, different data may be received in (e.g., a subset of) different HARQ processes (i.e., non-redundantly coupled HARQ processes).

The three variants are compatible in any combination or subcombination. For example, the radio communication may comprise a plurality of HARQ processes. A first subset of the HARQ processes may be redundantly coupled according to the first variant; a second subset of the HARQ processes may be redundantly coupled according to the second variant; and/or a third subset of the HARQ processes may be non-redundantly coupled according to the third variant. Two or three of the subsets may partially overlap.

A control message may be received that is indicative of the at least two HARQ processes. For example, the control message may be indicative of at least one of the first, second and third sets.

The control message may be indicative of the at least two HARQ processes that are coupled using the technique. For example, if different data is transmitted in different HARQ processes, the control message may be indicative of the coupled HARQ processes. If one or more subsets of the coupled HARQ processes are redundantly coupled, the control message (or a further control message) may be indicative of the one or more subsets.

The error detection scheme may depend on the CRC protecting the data in individual transport blocks or PDUs. Alternatively or in addition, the error detection scheme may depend on sequence numbers of the PDUs. For example, the error detection scheme may be indicative of an error in a HARQ process, if a PDU associated with the HARQ process is missing based on the sequence numbers. Alternatively or in addition, the error detection scheme may depend on consistency of the received data, for example, on a result of the comparison and/or combination.

As to another aspect, a method of transmitting data in a radio communication is provided. The method comprises or triggers a step of transmitting the data in at least two HARQ processes, wherein the transmission in each of the at least two HARQ processes is protected by an error detection scheme; a step of receiving, for each of the at least two HARQ processes, a feedback indicative of a result of the error detection scheme for the transmitted data; and a step of selectively retransmitting, for each of the at least two HARQ processes, the data depending on a logical combination of the received results of the error detection scheme for the at least two HARQ processes.

A station of a radio network may transmit the data. The method may be performed or triggered by the transmitting station of the radio network. The data may be transmitted to and/or the feedback may be received from a receiving station of the radio network. At the receiving station, the same feedback may be redundantly sent for each of the at least two HARQ processes based on a logical combination of results of the error detection scheme for the at least two HARQ processes.

The data may be retransmitted in each of the HARQ processes in response to the feedback. The data may be retransmitted, if the feedback as received for at least one of the at least two HARQ processes is indicative of a NACK for the data. Representing success and error in each of the received results by logical 1 (or true) and logical 0 (or false), respectively, the logical combination of the received results ("transmitter combination", e.g., used in the retransmitting step at the transmitting station) at the transmitting station may be an AND-combination. The logical combination of the results ("receiver combination", e.g., used in the sending step) at the receiving station may be an AND-combination or an OR-combination.

The data may be redundantly transmitted in the at least two HARQ processes. The feedback may be indicative of a comparison of the data received in the at least two HARQ processes, e.g., as to consistency or identity of the data received in the different HARQ processes.

The error detection scheme may use a CRC value transmitted in association with the data. Alternatively or in addition, the error detection scheme may use sequence numbers transmitted in association with PDUs carrying the data for detecting a missing PDU as the error.

The method may further comprise any feature disclosed in the context of the one method aspect and/or one or more steps corresponding to any of the steps of the one method aspect.

According to a further aspect, a control signal indicative of a configuration for a station configured for receiving data in a radio communication is provided. The configuration causes the station to perform any one of the steps of the one method aspect.

According to a further aspect, a control signal indicative of a configuration for a station configured for transmitting data in a radio communication is provided. The configuration causes the station to perform any one of the steps of the other method aspect.

The control signal may be received and/or sent on a Radio Resource Control (RRC) layer, a MAC layer and/or a RLC layer of the radio communication. For example, a data structure of the control signal may be implemented on the RRC layer, the MAC layer and/or the RLC layer of the radio communication.

As to another aspect, a computer program product is provided. The computer program product comprises program code portions for performing any one of the steps of the method aspects disclosed herein when the computer program product is executed by one or more computing devices. The computer program product may be stored on a computer-readable recording medium. The computer program product may also be provided for download via a data network, e.g., the radio network and/or the Internet. Alternatively or in addition, the method may be encoded in a Field-Programmable Gate Array (FPGA) and/or an Application-Specific Integrated Circuit (ASIC), or the functionality may be provided for download by means of a hardware description language.

As to one device aspect, a device for receiving data in a radio communication is provided. The device may be configured to perform or trigger the one method aspect. Alternatively or in addition, the device comprises a receiving unit configured to receive the data in at least two HARQ processes; an error detecting unit configured to perform, for each of the at least two HARQ processes, an error detection scheme for the received data; and a sending unit configured to send, for each of the at least two HARQ processes, a feedback based on a logical combination of results of the error detection scheme for the at least two HARQ processes.

As to another device aspect, a device for transmitting data in a radio communication is provided. The device may be configured to perform or trigger the other method aspect. Alternatively or in addition, the device comprises a transmitting unit configured to transmit the data in at least two HARQ processes, wherein the transmission in each of the at least two HARQ processes is protected by an error detection scheme; a receiving unit configured to receive, for each of the at least two HARQ processes, a feedback indicative of a result of the error detection scheme for the transmitted data; and a retransmitting unit configured to selectively retransmit, for each of the at least two HARQ processes, the data depending on a logical combination of the received results of the error detection scheme for the at least two HARQ processes.

As to a further device aspect, a device for receiving data in a radio communication is provided. The device comprises a processor and a memory, said memory containing instructions executable by said processor whereby the device is operative to receive the data in at least two HARQ processes; to perform, for each of the at least two HARQ processes, an error detection scheme for the received data; and to send, for each of the at least two HARQ processes, a feedback based on a logical combination of results of the error detection scheme for the at least two HARQ processes.

As to a further device aspect, a device for transmitting data in a radio communication is provided. The device comprises a processor and a memory, said memory containing instructions executable by said processor whereby the device is operative to transmit the data in at least two HARQ processes, wherein the transmission in each of the at least two HARQ processes is protected by an error detection scheme; to receive, for each of the at least two HARQ processes, a feedback indicative of a result of the error detection scheme for the transmitted data; and to selectively retransmit, for each of the at least two HARQ processes, the data depending on a logical combination of the received results of the error detection scheme for the at least two HARQ processes.

As to a further aspect, a station configured for receiving data in a radio communication is provided. The station may comprise the device according to the one device aspect or may be configured to perform or trigger the one method aspect. Alternatively or in addition, the station comprises a reception module for receiving the data in at least two HARQ processes; an error detection module for performing, for each of the at least two HARQ processes, an error detection scheme for the received data; and a feedback module for sending, for each of the at least two HARQ processes, a feedback based on a logical combination of results of the error detection scheme for the at least two HARQ processes.

As to a further aspect, a station configured for transmitting data in a radio communication is provided. The station may comprise the device according to the other device aspect or may be configured to perform or trigger the other method aspect. Alternatively or in addition, the station comprises a transmission module for transmitting the data in at least two HARQ processes, wherein the transmission in each of the at least two HARQ processes is protected by an error detection scheme; a feedback module for receiving, for each of the at least two HARQ processes, a feedback indicative of a result of the error detection scheme for the transmitted data; and a retransmission module for selectively retransmitting, for each of the at least two HARQ processes, the data depending on a logical combination of the received results of the error detection scheme for the at least two HARQ processes.

The devices and/or the stations may further include any feature disclosed in the context of the method aspects. Particularly, any one of the units and modules, or a dedicated unit or module, may be configured to perform or trigger one or more of the steps of any one of the method aspects.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for a 5G New Radio (NR) implementation, it is readily apparent that the technique described herein may also be implemented in any other radio network, including 3GPP Long Term Evolution (LTE) or a successor thereof, Wireless Local Area Network (WLAN) according to the standard family IEEE 802.11 and/or ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising a computer processor and memory coupled to the processor, wherein the memory is encoded with one or more programs that may perform the functions and steps or implement the units and modules disclosed herein.

Figure 1:
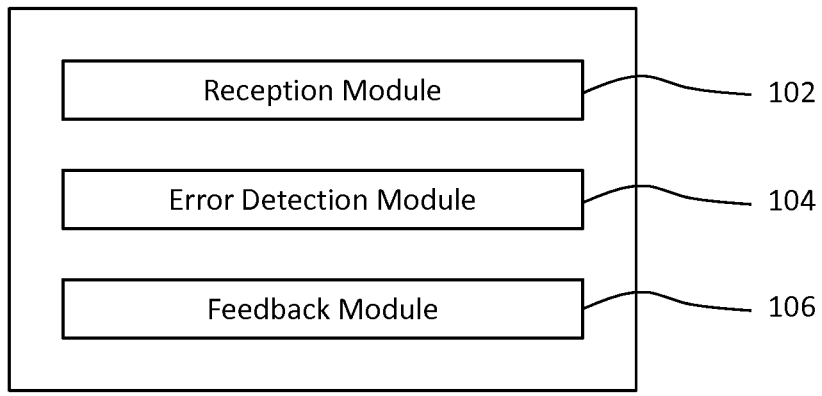
FIG. 1 shows a schematic block diagram of a device embodiment for receiving data in a radio communication.

FIG. 1 schematically illustrates a block diagram of a device 100 for receiving data in a radio communication involving a transmitting station and a receiving station. The device 100 may be implemented at the receiving station of the radio communication.

The device 100 comprises a reception module 102 for receiving radio signals in at least two hybrid automatic repeat request (HARQ) processes. The data is encoded in the radio signals. An error detection module 104 performs, for each of the at least two HARQ processes, an error detection scheme for the received data. Results of the error detection scheme may be indicative, individually for each of the HARQ processes, of whether or not a transmission error has corrupted the received data. A feedback module 106 sends, for each of the at least two HARQ processes, a feedback based on a logical combination of the results of the error detection scheme.

Due to the logical combination, the feedbacks sent in the different HARQ processes are correlated. For example, the feedbacks may be consistent as to whether or not an error has occurred. The logical combination may be an AND-combination (e.g., a logical conjunction or AND-gate) or an OR-combination (e.g., a logical disjunction or OR-gate).

Figure 2:
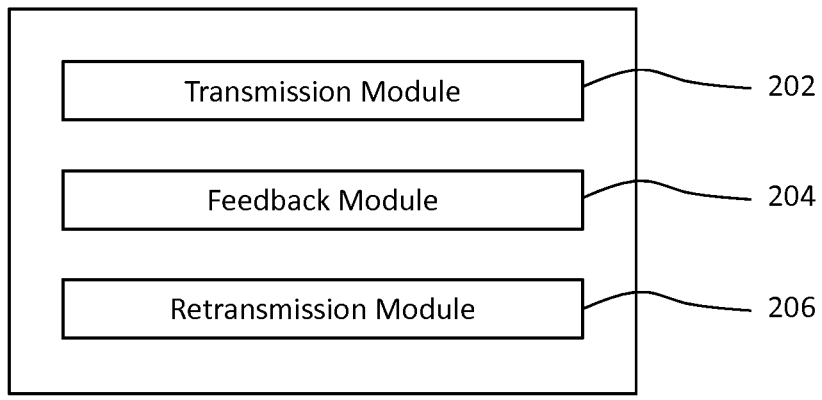
FIG. 2 shows a schematic block diagram of a device embodiment for transmitting data in a radio communication.

FIG. 2 schematically illustrates a block diagram of a device 200 for transmitting data in a radio communication involving a transmitting station and a receiving station. The device 200 may be implemented at the transmitting station of the radio communication.

The device 200 comprises a transmission module 202 for transmitting the data in at least two HARQ processes. The transmission in each of the at least two HARQ processes is protected by an error detection scheme that enables detecting an error in the data transmission. A feedback module 204 of the device 200 receives, for each of the at least two HARQ processes, a feedback indicative of a result of the error detection scheme for the transmitted data. The feedback may be sent for each HARQ process without error protection. The feedback that is individually sent for each HARQ process may be referred to as unreliably feedback.

A retransmission module 206 of the device 200 selectively retransmits, for each of the at least two HARQ processes, the data depending on a logical combination of the received results of the error detection scheme for the at least two HARQ processes. The logical combination may be an AND-combination (e.g., a logical conjunction or AND-gate). For example, the data transmission in any one of the HARQ processes may be considered successful only if all feedbacks, as received for the different HARQ processes, are indicative of an acknowledgment (ACK).

Each of the transmitting station and the receiving station may include a base station or a mobile station of a radio network. Each of the transmitting and receiving stations may be configured to provide radio access and/or to wirelessly connect to each other.

Figure 3:
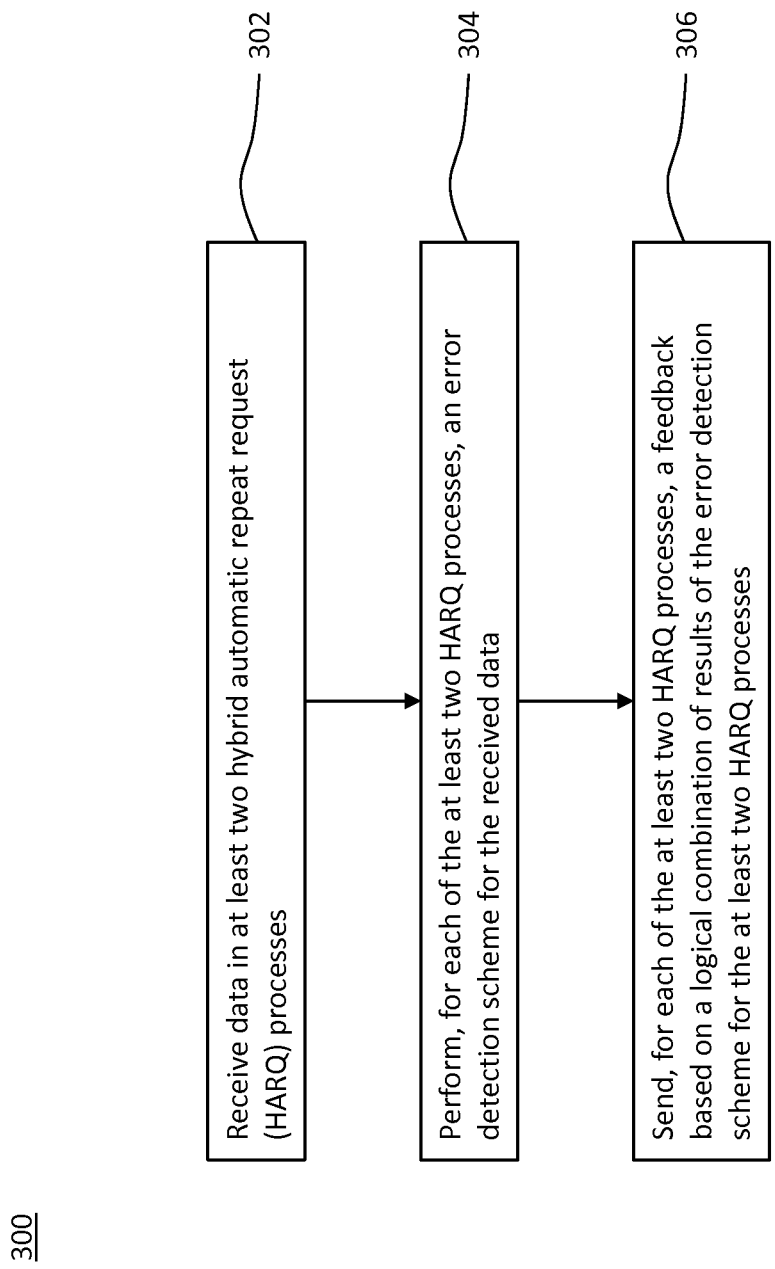
FIG. 3 shows a flowchart for a method embodiment for receiving data in a radio communication, which is implementable by the device of FIG. 1.

FIG. 3 shows a flowchart for a method 300 of receiving data in a radio communication. The method 300 comprises or triggers a step 302 of receiving the data in at least two HARQ processes; a step 304 of performing, for each of the at least two HARQ processes, an error detection scheme for the received data; and a step 306 of sending, for each of the at least two HARQ processes, a feedback based on a logical combination of results of the error detection scheme for the at least two HARQ processes.

The method 300 may be performed by the device 100, e.g., at the receiving station of the radio communication. For example, the modules 102, 104 and 106 may perform the steps 302, 304 and 306, respectively.

Figure 4:
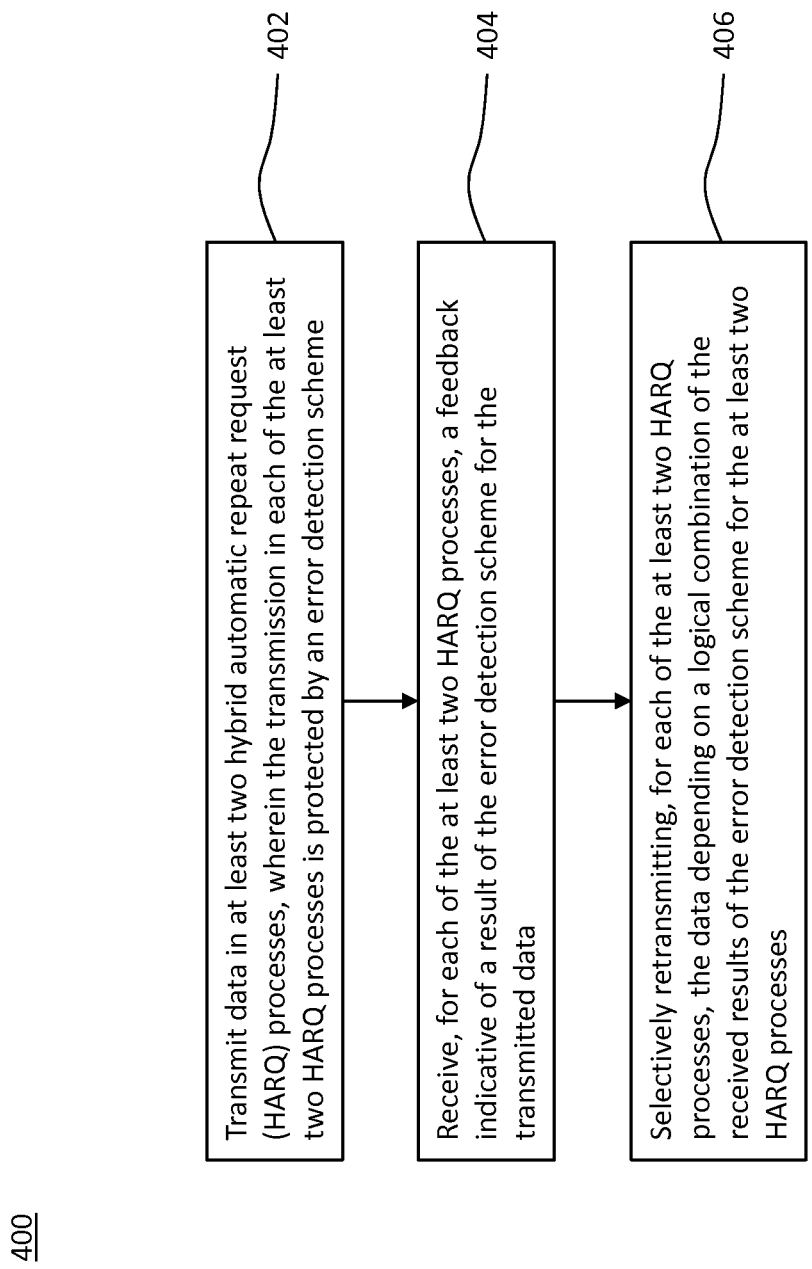
FIG. 4 shows a flowchart for a method embodiment for transmitting data in a radio communication, which is implementable by the device of FIG. 2.

FIG. 4 shows a flowchart for a method 400 of transmitting data in a radio communication. The method 400 comprises or triggers a step 402 of transmitting the data in at least two HARQ processes, wherein the transmission in each of the at least two HARQ processes is protected by an error detection scheme; a step 404 of receiving, for each of the at least two HARQ processes, a feedback indicative of a result of the error detection scheme for the transmitted data; and a step 406 of selectively retransmitting, for each of the at least two HARQ processes, the data depending on a logical combination of the received results of the error detection scheme for the at least two HARQ processes.

The method 400 may be performed by the device 200, e.g., at the transmitting station. For example, the modules 202, 204 and 206 may perform the steps 402, 404 and 406, respectively.

The at least two HARQ processes operated according to the method 300 and/or 400 are also referred to as "coupled" HARQ processes. The data transmission may use radio resources in time domain (e.g., using different orthogonal frequency-division multiplexing, OFDM, symbols or subframes), spatial domain (e.g., using different spatial channels such as beamforming or multiple-input and multiple-output, MIMO, streams) and/or frequency domain (e.g., using different carriers or resource blocks) allocated to the different coupled HARQ processes.

The radio network includes a wireless access network. For clarity, and without limitation, the technique is described within the context of LTE, i.e. the wireless access network includes an evolved UMTS Terrestrial Radio Access (E-UTRA) network. The skilled person appreciates that problems and solutions described herein are equally applicable to wireless access networks and User Equipments (UEs) implementing other radio access technologies and standards. LTE is used as an example technology that is particularly useful for understanding the technique and its advantages.

The coupled HARQ processes can improve reliability and/or latency of LTE, e.g., for CMTC use cases. The reliability improvement can relate to at least one of the HARQ feedback and the data transmission (e.g., the HARQ transmission). Redundantly coupled HARQ processes transmit the same duplicated or multiplied data for further improving reliability without increasing latency.

The technique can be implemented by coupling multiple HARQ processes, thus further enhancing the reliability. For simplicity, the technique is explained using two coupled HARQ processes.

Figure 5:
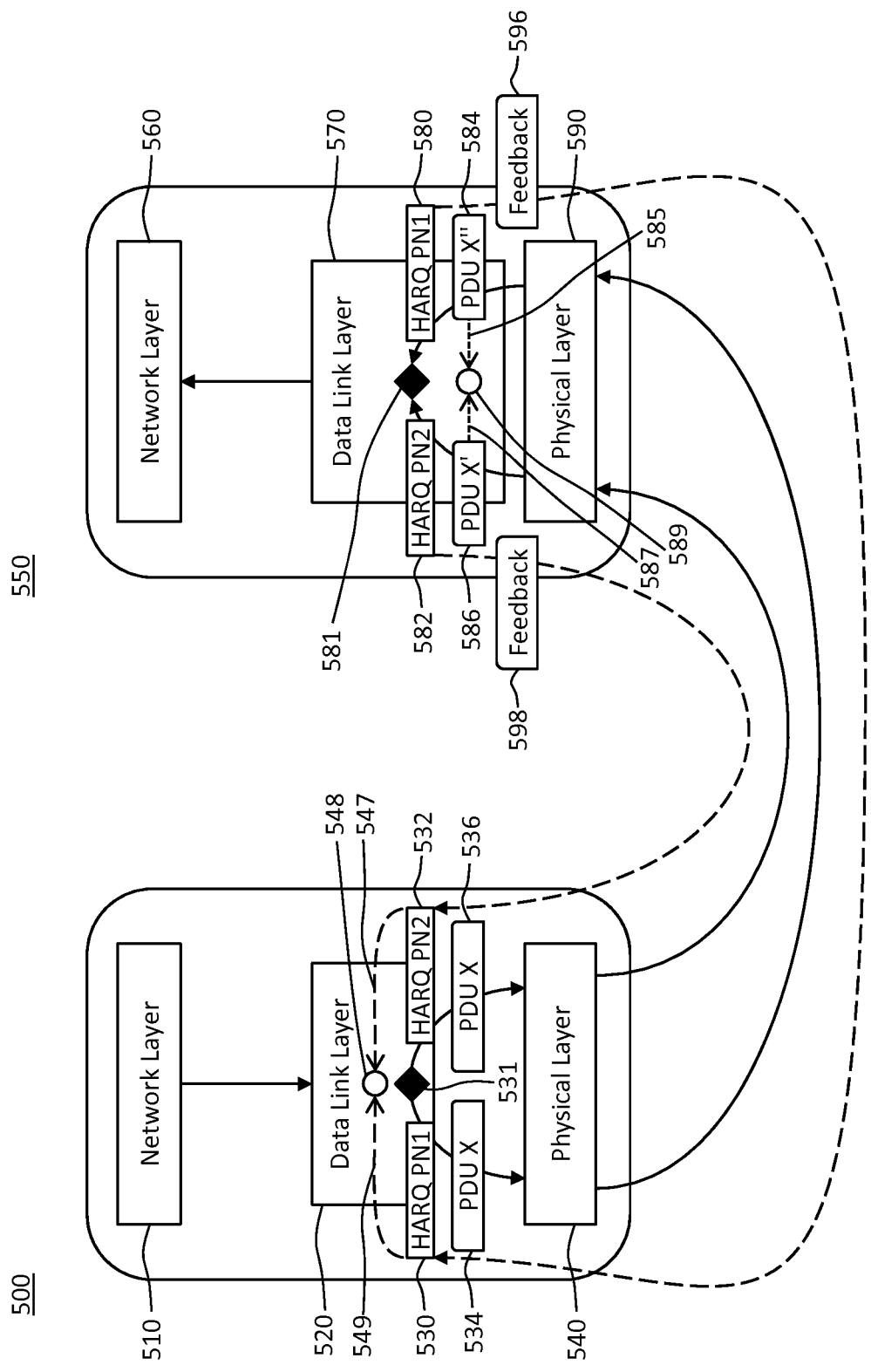
FIG. 5 shows a schematic protocol stack for a first implementation of the methods of FIGS. 3 and 4.

FIG. 5 schematically illustrates protocol stacks for the transmitting station 500 and the receiving station 550 for first embodiments of the devices 200 and 100, respectively. The protocol stack of the transmitting station 500 comprises a network layer 510, a data link layer 520 and a physical layer 540. The protocol stack of the receiving station 550 comprises a network layer 560, a data link layer 570 and a physical layer 590.

The data to be transmitted is provided by the network layer 510 at the transmitting station 500. In a substep 531 of the step 402, the data link layer 520 duplicates the data. Each copy of the data is fed into a corresponding one of the coupled HARQ processes 530 and 532. The corresponding PDUs 534 and 536 are transmitted by the physical layer 540 from the transmitting station 500 to the receiving station 550 according to the steps 402 and 302, respectively.

In the step 304, the physical layer 590 or the data link layer 580 of the receiving station 550 perform a CRC as the error detection scheme on each of the transport block or PDUs 584 and 586 in the HARQ processes 580 and 582 uniquely corresponding to the HARQ processes 530 and 532, respectively. The binary results 585 and 587 of the CRCs in the HARQ processes 580 and 582, respectively, are logically combined in a substep 589 of the step 306.

In the case of redundantly coupled HARQ processes 530-580 and 532-582, the receiving station 550 may apply two schemes. In a first variant, the error correction scheme for individual HARQ transmissions (e.g., the CRC protecting a transport block) is sufficiently reliable for the given use case. If the receiving station 550 successfully receives (e.g., successfully decodes) at least one of the HARQ transmission 530-580 and 532-582, receiving station 550 sends ACK on both HARQ processes 580 and 582 as the feedbacks 596 and 598 in the step 306. Otherwise, the receiving station sends NACK on both HARQ processes as the feedback in the step 306. The first variant may be implemented using an OR-combination in the substep 589.

In a second variant, the reliability of the error correction scheme (e.g., the CRC) is not sufficient, e.g., to meet the requirements of a particular use case. If one of the HARQ transmissions 530-580 and 532-582 is not successful, NACK is sent on both HARQ processes 580 and 582 as the feedbacks 596 and 598 in the step 306. Only if both HARQ transmissions 530-580 and 532-582 are successfully received (e.g., successfully decoded), ACK is sent on both HARQ processes 580 and 582 as the feedbacks 596 and 598 in the step 306. The second variant may be implemented using an AND-combination in the substep 589.

Optionally, e.g., in the first variant and/or the second variant, the reliability of the data transmission (i.e., the observability of reliability), can be improved by comparing in a step 581 the data successfully received on the redundantly coupled HARQ processes 580 and 582. The step 581 may be implemented as a substep of the step 306, wherein a negative comparison triggers sending NACK as the feedback.

In a third variant (e.g., omitting the substeps 531 and 581), different data is transmitted in the step 402 on the HARQ processes 530 and 532. If one of the HARQ transmissions 530-580 and 532-582 is not successful, NACK is sent on both HARQ processes 580 and 582 as the feedbacks 596 and 598 in the step 306. Only if both HARQ transmissions 530-580 and 532-582 are successfully received (e.g., successfully decoded), ACK is sent on both HARQ processes 580 and 582 as the feedbacks 596 and 598 in the step 306. The third variant may be implemented using an AND-combination in the substep 589. The non-redundantly coupled HARQ processes 530-580 and 532-582 can increase the feedback reliability without substantially decreasing the usable data rate of the radio communication.

In any variant, the receiving station 550 sends in the step 306 the feedbacks 596 and 598 in the coupled HARQ processes 580 and 582, respectively. Each of the feedbacks 596 and 598 is indicative of the output of the combination 589 of the results 585 and 587.

The transmitting station 500 receives in the step 404 the feedbacks 596 and 598 in the coupled HARQ processes 530 and 532, respectively. The feedbacks 596 and 598 are indicative of results 547 and 549, respectively. Each of the feedbacks 596 and 598, as sent, is indicative of the same output of the combination 589 (and not the individual results 585 and 589). Furthermore, one of the received results 547 and 549 may deviate from the output of the combination 589, e.g., since the feedback is not CRC protected. That is, the individual feedback is unreliable.

The transmitting station 500 combines in a substep 548 of the step 404 or 406 the received results 547 and 549. The transmitting station 500 assumes (e.g., in each of the three variants) that the data transmission has been successful, only if ACK is received for all of the (e.g., redundantly or non-redundantly) coupled HARQ processes. Otherwise, the data is retransmitted in the step 406. This may be implemented by an AND-combination in the substep 548.

Figure 6:
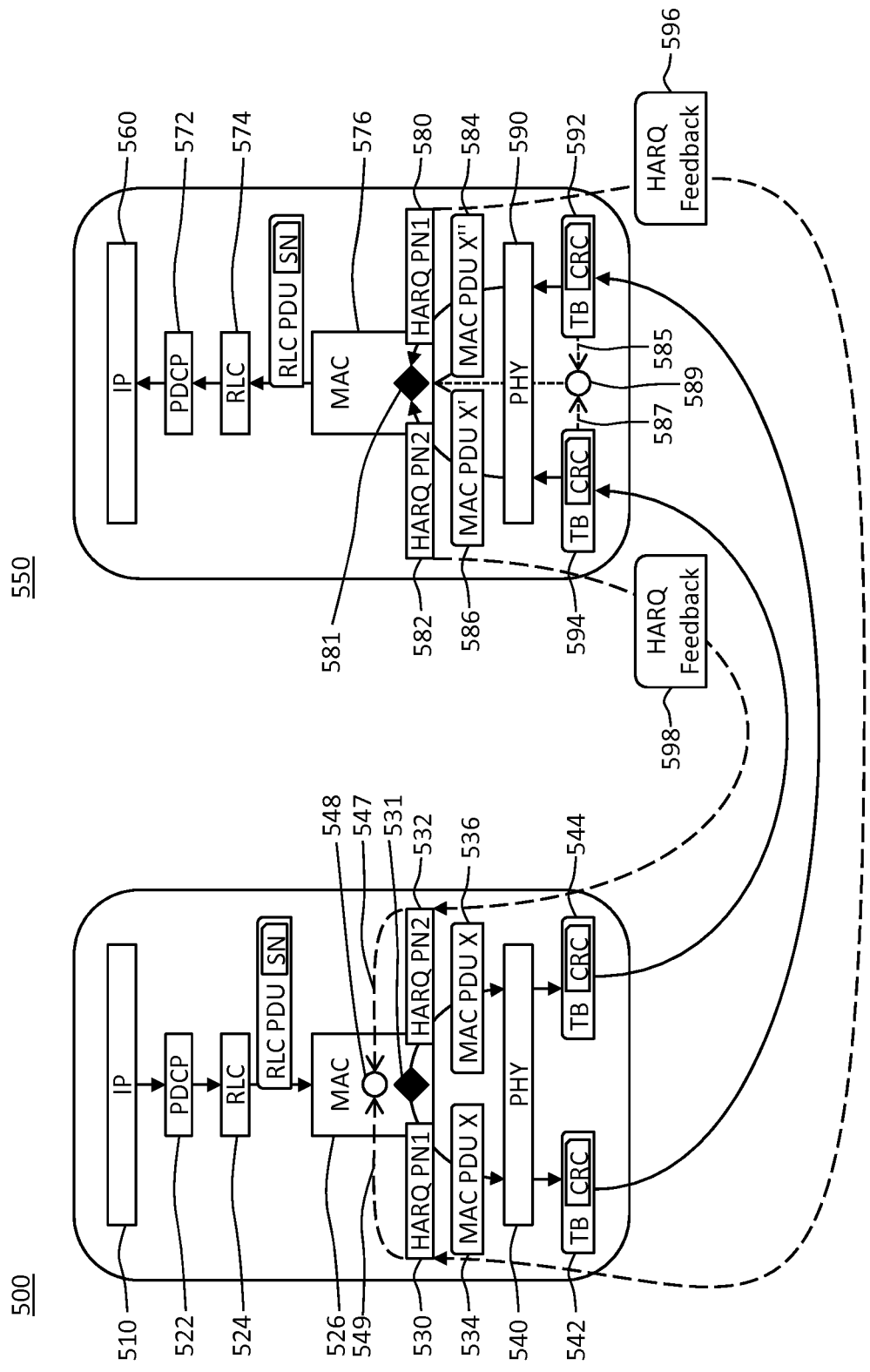
FIG. 6 shows a schematic protocol stack for a second implementation of the methods of FIGS. 3 and 4.
Figure 7:
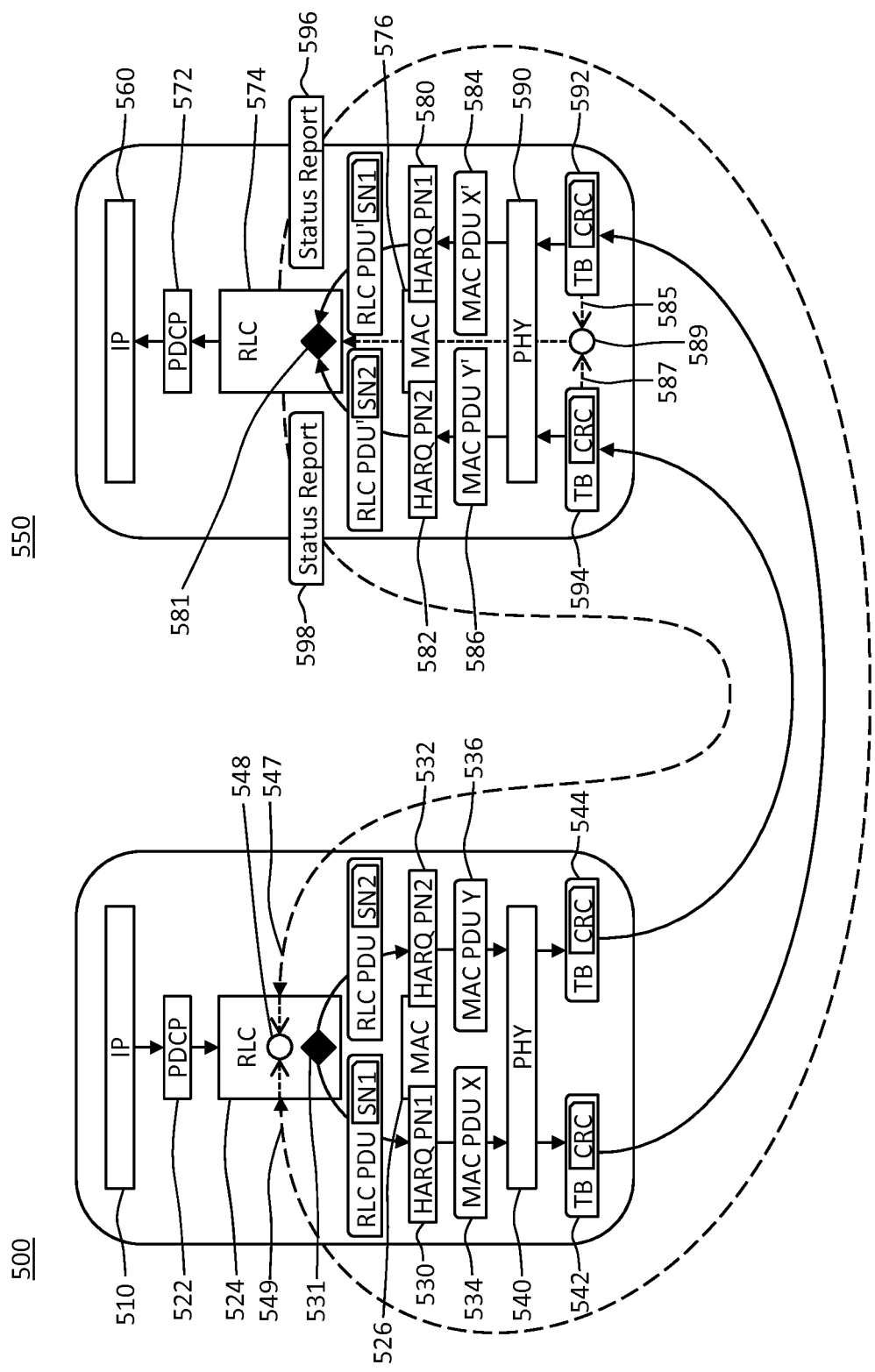
FIG. 7 shows a schematic protocol stack for a third implementation of the methods of FIGS. 3 and 4.

FIGS. 6 and 7 schematically illustrate protocol stacks for the radio communication of the stations 500 and 550 for a second embodiment and a third embodiment, respectively. Each of the second and third embodiments may be an implementation of the first embodiment. Equal reference signs in the FIGS. 5 to 7 indicate corresponding or exchangeable features of the embodiments.

The second and third embodiments are compatible with the LTE protocol stack. The network layers 510 and 560 may provide Internet Protocol (IP) data or Radio Resource Control (RRC) messages as the data to be transmitted. Each of the data link layers 520 and 570 may include sublayers 522 and 572, 524 and 574 as well as 526 and 576 for a Packet Data Convergence Protocol (PDCP), Radio Link Control (RLC) and Medium Access Control (MAC), respectively.

The data transmission 402 in the HARQ processes 530 and 532 is based on transport blocks 542 and 544, respectively. Each of the transport blocks 542 and 544 includes a CRC value protecting the payload (e.g., the corresponding MAC PDU). The transmitted transport blocks 542 and 544 are uniquely associated with the HARQ processes 530 and 532, respectively.

The data reception 302 in the HARQ processes 580 and 582 is based on received transport blocks 592 and 594, respectively. The error detection scheme performed by the device 100 at the receiving station 550 in the step 304 is based on the CRC values in the received transport blocks 592 and 594. The received transport blocks 592 and 594 are uniquely associated with the HARQ processes 580 and 582, respectively. Each of the received transport blocks 592 and 594 includes a CRC value. The error detection scheme is independently performed for each of the received transport blocks 592 and 594.

The second embodiment of FIG. 6 uses LTE HARQ feedbacks of the MAC layers 526 and 576 for implementing the feedbacks 596 and 598. The second embodiment implements for the device 200 at the transmitting station 500 the optional substep 531 of duplicating the redundantly coupled HARQ processes and the combination substep 548 in the MAC layer 526. For generating the two HARQ processes 530 and 531, MAC PDUs are duplicated in the MAC layer 526. The duplicated MAC PDUs 534 and 536 are sent via the HARQ processes 530 and 532, respectively.

For the device 100 at the receiving station 550, the substep 589 of combining the CRC results 585 and 587 and the optional substep 581 of comparing the data received in the redundantly coupled HARQ processes 580 and 582 are implemented in the MAC layer 576 or implemented in the PHY layer 590 and reported to the MAC layer 576.

Redundant MAC PDUs 584 and 586 are received via the HARQ processes 580 and 582, respectively. Optionally, the received MAC PDUs 584 and 586 are compared in the substep 581 in the MAC layer 576.

The third embodiment of FIG. 7 uses LTE status reports exchanged between the RLC layers 524 and 574 for implementing the feedbacks 596 and 598. The third embodiment implements for the device 200 at the transmitting station 500 the optional substep 531 of duplicating MAC PDUs 534 and 536 to transmission on the redundantly coupled HARQ processes and the combination substep 548 in the RLC layer 524.

For the device 100 at the receiving station 550, the substep 589 of combining the CRC results 585 and 587 and the optional substep 581 of comparing the data received in the redundantly coupled HARQ processes 580 and 582 are implemented in the PHY layer 590 or MAC layer 576 and reported to the RLC layer 576.

In case of a positive CRC, the corresponding MAC PDUs 584 and 586 are provided to the RLC layer 574.

An RLC header in each RLC PDU includes a sequence number (SN). Each of the duplicating step 531 and the comparing step 581 may be implemented by one RLC entity at the transmitting station 500 and the receiving station 550, respectively. The RLC PDUs communicated in different HARQ processes may be distinguished by different SNs at the RLC layers 524 and 574.

By the comparison 581 of the redundantly received RLC PDUs, the RLC layer 574 at the receiving station 550 can validate the success of the data transmission. If a CRC check fails, or if both CRC checks are successful but the RLC validation of the duplicate receptions fails, the data is retransmitted.

A retransmission according to the ARQ operation of the RLC layer 574 may be triggered by including the NACK in the status report for the received RLC PDUs. This is schematically illustrated in FIG. 7. In a variant of the third embodiment, the RLC layer 574 triggers a retransmission by indicating to lower MAC layer 576 that a HARQ retransmissions is to be performed or that failure of the HARQ transmission of the MAC PDUs 584 and 586 is to be assumed.

The comparing step 581 of the RLC layer 576 (as a higher layer) validates the HARQ transmission success of the MAC layer 574 (as a lower layer). In case the data transmission is validated, one of the duplicate received packets can be delivered to a higher layer (e.g., the PDCP layer 572).

In any embodiment, the comparing step 581 can achieve a very high transmission reliability, while latency was not increased.

The different HARQ processes 530 and 580 as well as 532 and 582 may be implemented using different carries for the data transmission. 3GPP Release 10 introduced LTE Carrier Aggregation (CA) for exchanging data between UE and eNB on multiple carriers. The technique can be implemented as an extension of CA by coupling the at least two HARQ processes on different carriers. By way of example, the CA implementation may run (at each station) multiple HARQ entities in parallel using multiple PHY layer interfaces and parts of the MAC per UE-eNB communication.

Furthermore, 3GPP Release 12 introduced LTE Dual Connectivity (DC) enabling the UE to communicate with two eNBs (i.e., a master eNB and a secondary eNB) at the same time. In a split bearer architecture, one of the eNBs assumes the role of the master eNB which is the only eNB terminating the PDCP. The data to be transmitted is provided at the master eNB as an instance of the transmitting station 500 by the PDCP layer 522 and transmitted directly to the UE as the receiving station 550 using a first HARQ process via the RLC layer 524, the MAC layer 526 and the PHY layer 540 of the master eNB. The data from the PDCP layer 522 is further transmitted using a second HARQ process by forwarding the data via a backhaul link to the secondary eNB, which transmits the data to the UE. 3GPP Release 13 extends the DC functionality to LTE WLAN Aggregation (LWA), wherein a WLAN node assumes the role of the secondary eNB.

Alternatively or in addition, the coupled HARQ processes may use radio resources that are distinguished in the time domain, the spatial domain and/or the frequency domain to improve the HARQ feedback reliability and/or HARQ transmission reliability. In the time domain, for example, the HARQ process with HARQ process identifier n may be coupled with the HARQ process n+1, i.e. two consecutive HARQ processes are coupled. In the frequency domain or carrier domain, the coupled HARQ processes may transmit (at the device 200) and receive (at the device 100) in the same subframe and on different carriers (e.g., using CA). In the spatial domain, the HARQ processes may transmit (at the device 200) and receive (at the device 100) in the same subframe and on different streams (e.g., using MIMO).

An example of the first variant, which is implementable using any of the above embodiments, is described in more detail. The first variant can achieve improved HARQ NACK feedback reliability (e.g., lower NACK-to-ACK error). The first variant may be implemented, if the error protection of the CRC is sufficiently reliable for the use case.

The first variant uses duplicate transmissions, i.e., redundantly coupled HARQ processes. Thereby, the HARQ processes transmit the same duplicated data.

The device 200 at the transmitting station 500 determines that a transmission is successful, only if ACK is received for all coupled HARQ processes in the step 404. Otherwise, the data is retransmitted on each of the HARQ processes individually in the step 406.

If the device 100 at the receiving station 550 can decode at least one of the coupled HARQ transmissions, the device 100 sends ACK on both processes as the feedback in the step 306.

Otherwise, the device 100 sends NACK on both processes. This improves the reliability of the HARQ feedback. For example, an error for NACK to ACK, leading to a false positive (i.e., a transmission being regarded successful at the transmitting station, even though it was not), has the probability of 1E-3 or 1E-4. By duplicating the feedbacks 596 and 598, the probability can be reduced to 1E-6 or 1E-8. The advantage of the first variant is a reduced overall transmission delay, since slow RLC retransmissions (which occur most often due to a NACK-to-ACK false positive) are avoided.

Below table outlines an implementation of the first variant.

| Tx: data transmission | Rx: CRC passed? | Rx: feedback as sent | Tx: feedback combination | Tx: data retransmission |
|---|---|---|---|---|
| HARQ 1: Data 1 | Both | ACK | ACK if both ACK | — |
| HARQ 2: Data 1 | | ACK | | — |
| HARQ 1: Data 1 | Only one | ACK | ACK if both ACK | — |
| HARQ 2: Data 1 | | ACK | | — |
| HARQ 1: Data 1 | None | NACK | NACK, else | HARQ 1: Data 1 |
| HARQ 2: Data 1 | | NACK | | HARQ 2: Data 1 |

Steps indicated in temporal order from the left column to the right column are performed by the devices 100 and 200 according to the label "Rx" and "Tx", respectively. Hence, the data transmission residual error is unchanged, e.g., $10^{-6}$. The error probability for ACK-to-NACK is reduced to $10^{-3} \cdot 10^{-3}$, and the error probability for NACK-to-ACK is reduced to $10^{-3} \cdot 10^{-3}$. The overhead of the data transfer is 100% due to the duplicate transmission in all cases.

An example of the second variant, which is implementable using any of the above embodiments, is described in more detail. The second variant can achieve improved transmission reliability (e.g., beyond the CRC reliability of a single transmission) and improved HARQ feedback reliability. The second variant may be implemented, if the CRC is not sufficiently reliable for the use case.

The second variant uses duplicate transmissions, i.e., redundantly coupled HARQ processes. Thereby, the HARQ processes transmit the same duplicated data.

The device 200 at the transmitting station 500 determines that a transmission is successful, only if ACK is received for all coupled HARQ processes in the step 404. Otherwise, the data is retransmitted on each of the HARQ processes individually in the step 406.

The device 100 at the receiving station 550 sends in the step 306 NACK on both HARQ processes as the feedback, if one HARQ transmissions is not successful. Only if both HARQ transmissions can successfully decode, ACK is sent on both HARQ processes as the feedback in the step 306, as indicated in below table.

| Tx: data transmission | Rx: CRC passed? | Rx: feedback as sent | Tx: feedback combination | Tx: data retransmission |
|---|---|---|---|---|
| HARQ 1: Data 1 | Both | ACK | ACK if both ACK | — |
| HARQ 2: Data 1 | | ACK | | — |
| HARQ 1: Data 1 | Only one | NACK | NACK, else | HARQ 1: Data 1 |
| HARQ 2: Data 1 | | NACK | | HARQ 2: Data 1 |
| HARQ 1: Data 1 | None | NACK | NACK, else | HARQ 1: Data 1 |
| HARQ 2: Data 1 | | NACK | | HARQ 2: Data 1 |

The reliability of the overall transmission is improved, since a false-positive of the data is only possible with a probability of $10^{-6} \cdot 10^{-6}$, i.e., if both CRCs are false-positives. Furthermore, also the HARQ feedback reliability improves as in the first variant.

Hence, the data transmission residual error is $10^{-12}$. The probability for an ACK-to-NACK error is $10^{-3} \cdot 10^{-3}$, and the probability of for an NACK-to-ACK error is $10^{-3} \cdot 10^{-3}$. The overhead of the data transmission is (100+x) % due to the duplicate transmission in all cases, plus redundant retransmission in x % of all cases.

The third variant uses non-redundantly coupled HARQ processes to achieve an improved HARQ NACK feedback reliability, e.g., a lower NACK-to-ACK error probability. Thereby, the device 200 does not duplicate transmissions in the step 531, which is radio resource efficient.

The third variant does not need duplicate transmissions. The device 200 at the transmitting station 500 operates its HARQ processes independently of each other for the data transmission 402.

The device 100 at the receiving station 550 applies HARQ process coupling. I.e., the device 100 sends NACK on both processes in the step 306, if one of the individual decodes fails in the step 304.

The device 200 at the transmitting station 500 applies HARQ process coupling in the feedback interpretation. The device 200 determines that the transmission on the coupled HARQ processes is successful, only if ACK is received for all coupled HARQ processes in the step 404.

Otherwise (i.e., it the device 200 receives at least one NACK), the device 200 retransmits according to the step 406 on each of the HARQ processes. That is, both the data 1 and the data 2 (respectively transmitted on the coupled HARQ processes in the step 402) are retransmitted in their corresponding HARQ processes in the step 406, as indicated in below table.

| Tx: data transmission | Rx: CRC passed? | Rx: feedback as sent | Tx: feedback combination | Tx: data retransmission |
|---|---|---|---|---|
| HARQ 1: Data 1 | Both | ACK | ACK if both ACK | — |
| HARQ 2: Data 2 | | ACK | | — |
| HARQ 1: Data 1 | Only one | NACK | NACK, else | HARQ 1: Data 1 |
| HARQ 2: Data 2 | | NACK | | HARQ 2: Data 2 |
| HARQ 1: Data 1 | None | NACK | NACK, else | HARQ 1: Data 1 |
| HARQ 2: Data 2 | | NACK | | HARQ 2: Data 2 |

While this introduces an overhead in case one of the previous data transmissions had been successful while the other one was not, the NACK-to-ACK error probability is reduced from 1E-3 or 1E-4 to 1E-6 or 1E-8. In this way, an additional delay of correcting the false-positive (from NACK to ACK) at higher protocol layers (e.g., using an RLC retransmission) is avoided.

The residual error of the data transmission is unchanged, e.g., $10^{-6}$. The probability for ACK-to-NACK error is $10^{-3} \cdot 10^{-3}$, and the probability for NACK-to-ACK error is $10^{-3} \cdot 10^{-3}$. The overhead of the data transmission is increased, only in case one data transmission was ACK, the other one was NACK, but NACK had been sent on both. Denoting the Block Error Rate by BLER, the overhead is BLER·(1−BLER)+(1−BLER)*BLER, i.e. 18% in case of BLER=10%.

Optionally, in case an insufficient amount of data is available for the independent data transmission on both coupled HARQ processes, the padding may be transmitted on the otherwise unused HARQ process.

In any variant or embodiment, the UE (as the station 500 or 550) may be configured by means of control signaling to apply the technique. The control signaling may be indicative of a configuration for the technique. The configuration may define at least one of the HARQ processes that are coupled, whether or not HARQ processes are redundantly coupled, sets of redundantly coupled HARQ processes and sets of non-redundantly coupled HARQ processes, which variant is to be applied (e.g., in the context of which subsets of the HARQ processes) and any other scheme for data transmission, data reception and sending feedback.

The configuration can be provided by the eNB to the UE with RRC signaling or by means of MAC-level signaling, i.e. scheduling commands (e.g. in Downlink Control Information, DCI, and/or on a Physical Downlink Control Channel, PDCCH). Alternatively or in addition, the configuration can be provided via RRC signaling (which may be slower than MAC signaling) and stay inactive until an activation command is provided with the MAC signaling.

For a downlink transmission, receiver and feedback schemes performed by the UE as the receiving station 550 may be altered. The configuration may define whether ACK on both processes shall be generated even though only one process is successfully decoded (e.g., according to the first variant), or NACK shall be generated for both processes even though only one of them failed decoding (e.g., according to the second or third variant).

For uplink transmissions, the UE may be configured by the control signaling to determine that data transmission on a coupled HARQ process is ACK, only if the feedback received on all coupled HARQ processes is received as ACK. Alternatively or in addition, the control signaling configures the UE for the duplicate transmission, e.g., according to first or second variant.

It is beneficial to switch the operation of the stations 500 and 550 between different modes of the technique, e.g., depending on use case and/or channel condition. For example, the control signaling may configure the UE to improve the transmission reliability according to the second variant, and to improve efficiency of the transmission according to the third variant. The first variant may be used if not sufficient data is available to transmit on both HARQ processes.

Figure 8:
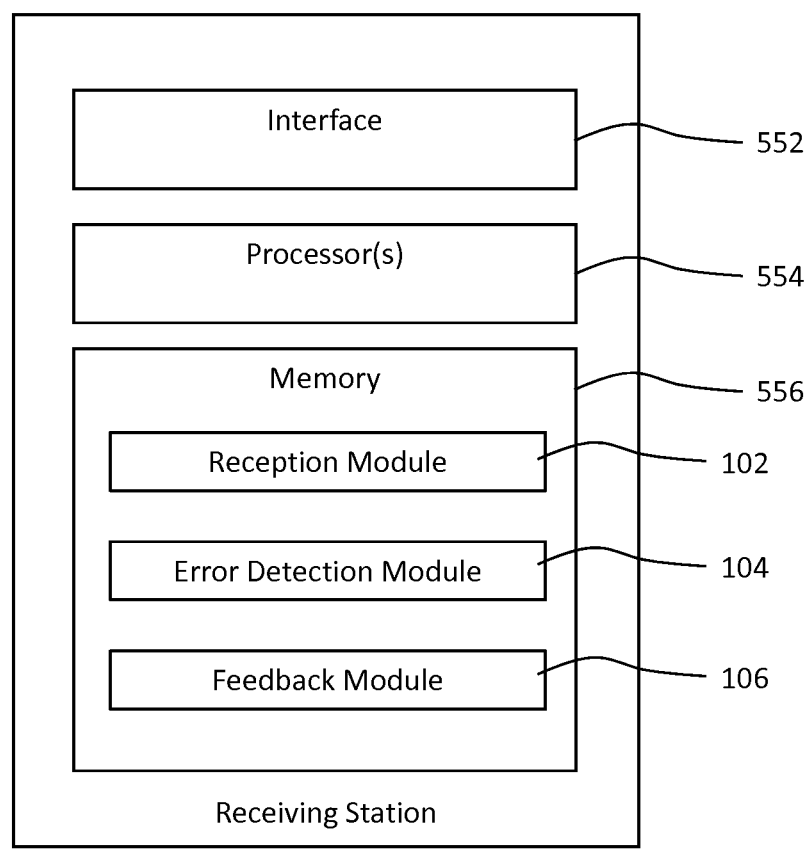
FIG. 8 shows a schematic block diagram of an embodiment of a receiving station for performing the method of FIG. 3.

FIG. 8 shows a schematic block diagram for an embodiment of a receiving station 550. The receiving station 550 comprises a radio interface 552 for radio communication with a transmitting station, one or more processor circuits 554 for performing the method 300 and memory 556 coupled to the processor circuits 554. The memory 556 is encoded with instructions that implement each of the modules 102, 104 and 106.

The one or more processor circuits 554 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other station components, such as the memory 556, data reception functionality. For example, the one or more processor circuits 554 may execute instructions stored in the memory 556. Such functionality may include providing various features and steps discussed herein, including any of the benefits disclosed herein.

Figure 9:
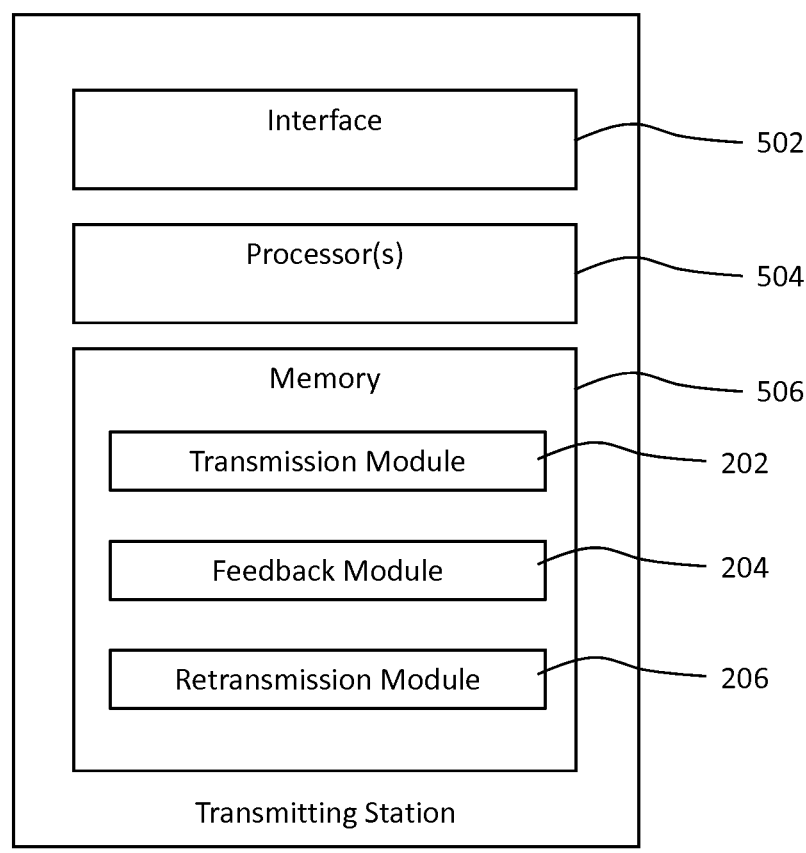
FIG. 9 shows a schematic block diagram of an embodiment of a transmitting station for performing the method of FIG. 4.

FIG. 9 shows a schematic block diagram for an embodiment of a transmitting station 500. The transmitting station 500 comprises a radio interface 502 for radio communication with a receiving station, one or more processor circuits 504 for performing the method 400 and memory 506 coupled to the processor circuits 504. The memory 506 is encoded with instructions that implement each of the modules 202, 204 and 206.

The one or more processor circuits 504 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other station components, such as the memory 506, data transmitter functionality. For example, the one or more processor circuits 504 may execute instructions stored in the memory 506. Such functionality may include providing various features and steps discussed herein, including any of the benefits disclosed herein.

As has become apparent from above description of exemplary embodiments, the technique can achieve higher reliability, e.g., of an LTE system. The technique can enable deployment of LTE in CMTC use cases.

The technique can be implemented to improve reliability while at the same time latency is not necessarily increased or even decreased. Embodiments are able to identify falsely as successful accepted data.

Embodiments can be deployed for factory automation by wirelessly connecting actuators, sensors and control systems with each other, e.g., with latency requirements in a range from some few tens of milliseconds to about 1 ms latency. Alternatively or in addition, motion of construction robots can be controlled (e.g., with few milliseconds to 0.1 ms latency. Machines can be remotely control, e.g., with 5 ms to 100 ms latency. Control or status information can be exchanged for smart energy grids, e.g., within 3 ms to 5 ms.

The technique can be implemented to fulfill latency requirements that are coupled to a reliability requirement. E.g. in some factory automation scenarios, a transmission has to be completed within 1 ms and be successful with a probability of $1-10^{-9}$.

The technique can be implemented in communication systems according to LTE and newly developed radio access, such as 3GPP NR.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of data processing in a radio communication network, the method comprising:
   receiving data in at least two Hybrid Automatic Repeat Request (HARQ) processes;
   performing, for each of the at least two HARQ processes, an error detection scheme for the received data; and
   sending multiple same feedbacks, one for each of the at least two HARQ processes, wherein:
      the feedback is based on a logical combination of results of the error detection scheme for the at least two HARQ processes; and
      the feedback sent for each of the at least two HARQ processes is indicative of an acknowledgement (ACK) or a negative acknowledgement (NACK) for the data.

2. The method of claim 1, wherein the feedback includes at least one of a HARQ feedback and a Radio Link Control (RLC) status report.

3. The method of claim 1, further comprising receiving a retransmission of the data in each of the at least two HARQ processes in response to sending the feedback.

4. The method of claim 1, wherein the feedback sent for each of the at least two HARQ processes is indicative of an acknowledgement (ACK) if the error detection scheme results in no error for at least one of the HARQ processes.

5. The method of claim 4, wherein the feedback sent for each of the at least two HARQ processes is indicative of a negative acknowledgement (NACK) if the error detection scheme results in an error for each of the HARQ processes.

6. The method of claim 1, wherein the feedback sent for each of the at least two HARQ processes is indicative of an acknowledgement (ACK) if the error detection scheme results in no error for each of the HARQ processes.

7. The method of claim 6, wherein the feedback sent for each of the at least two HARQ processes is indicative of a NACK if the error detection scheme results in an error for at least one of the HARQ processes.

8. The method of claim 1, wherein the data received in the at least two HARQ processes is based on a transmission of the same data in the at least two HARQ processes.

9. The method of claim 8, further comprising comparing the data received in the at least two HARQ processes.

10. The method of claim 1, wherein the received data includes first data transmitted in a first HARQ process and second data different from the first data transmitted in a second HARQ process.

11. A method of data processing in a radio communication network, the method comprising:
    transmitting data in at least two hybrid automatic repeat request (HARQ) processes, wherein the transmission in each of the at least two HARQ processes is protected by an error detection scheme;
    receiving multiple same feedbacks, one for each of the at least two HARQ processes, wherein:
       the feedback is indicative of a result of the error detection scheme for the transmitted data; and
       the feedback received for each of the at least two HARQ processes is indicative of an acknowledgement (ACK) or a negative acknowledgement (NACK) for the data; and
    selectively retransmitting, for each of the at least two HARQ processes, the data depending on a logical combination of the received results of the error detection scheme for the at least two HARQ processes.

12. The method of claim 11, wherein the data is retransmitted if the feedback received for at least one of the at least two HARQ processes is indicative of the negative acknowledgement (NACK) for the data.

13. The method of claim 11, wherein the data is redundantly transmitted in the at least two HARQ processes.

14. The method of claim 11, wherein the transmitted data includes first data transmitted in a first HARQ process and second data different from the first data transmitted in a second HARQ process.

15. The method of claim 11, further comprising sending or receiving a control message that is indicative of the at least two HARQ processes.

16. The method of claim 11, wherein the error detection scheme depends on:
    a cyclic redundancy check (CRC) value transmitted in association with the data; or
    sequence numbers transmitted in association with protocol data units (PDUs) including the data.

17. A device for receiving data in a radio communication, the device comprising:
    processing circuitry;
    memory containing instructions executable by the processing circuitry whereby the device is operative to:
       receive the data in at least two hybrid automatic repeat request (HARQ) processes; perform, for each of the at least two HARQ processes, an error detection scheme for the received data; and
       send multiple same feedbacks, one for each of the at least two HARQ processes, wherein:
       the feedback is based on a logical combination of results of the error detection scheme for the at least two HARQ processes; and the feedback received for each of the at least two HARQ processes is indicative of an acknowledgement (ACK) or a negative acknowledgement (NACK) for the data.

18. A device for radio communication, the device comprising:
    processing circuitry;
    memory containing instructions executable by the processing circuitry whereby the device is operative to:
       transmit data in at least two hybrid automatic repeat request (HARQ) processes, wherein the transmission in each of the at least two HARQ processes is protected by an error detection scheme;
receive multiple same feedbacks, one for each of the at least two HARQ processes, wherein:
  the feedback is indicative of a result of the error detection scheme for the transmitted data; and
  the feedback received for each of the at least two HARQ processes is indicative of an acknowledgement (ACK) or a negative acknowledgement (NACK) for the data; and
selectively retransmit, for each of the at least two HARQ processes, the data depending on a logical combination of the received results of the error detection scheme for the at least two HARQ processes.

\* \* \* \* \*